United States Patent Office 3,849,556
Patented Nov. 19, 1974

3,849,556
INSECTICIDAL COMPOSITION CONTAINING SURFACE ACTIVE DIURETHANES AND THIOPHOSPHORIC ACID ESTERS
Werner Wolff, Neubotting an der Inn, and Ruth Faber and Kasimir Ruchlack, Burgkirchen an der Alz, Germany (all c/o Farbwerke Hoechst AG, Frankfurt am Main, Germany)
No Drawing. Original application Aug. 15, 1968, Ser. No. 752,755. Divided and this application Aug. 11, 1972, Ser. No. 226,239
Claims priority, application Germany, Aug. 26, 1967, F 53,335
Int. Cl. A01n 9/36
U.S. Cl. 424—213
1 Claim

ABSTRACT OF THE DISCLOSURE

Insecticidal compositions containing thiophosphoric acid ester insecticides and diurethane emulsifiers which are prepared by reacting a diisocyanate with 1 mol of a bulk polymer consisting of an addition product of ethylene oxide onto a water-insoluble polyether and 1 mol of an ethoxylated alcohol or alkyl phenol or alkyl naphthol.

---

This application is a division of application Ser. No. 752,755, filed Aug. 15, 1968.

The present invention concerns surface-active compounds, especially surface-active diurethanes, in particular surfactants obtained by reacting 1 mol of a bulk polymer of a molecular weight of 1,000 to 6,000 consisting of a water-insoluble polyether of a molecular weight of 500 to 3,000 on the basis of propylene oxide, butylene oxide or epichloro-hydrine, to which 35 to 100%, referred to the weight of the polyether, of ethylene oxide was added, and 1 mol of a polyether alcohol of the formula R—(C$_2$H$_4$O)$_n$H in which R is alkyl of 8 to 18 carbon atoms, mono-, bis- or tris-alkyl-benzene or mono-, bis- or tris-alkyl naphthalene, each alkyl containing 4 to 22 carbon atoms, and $n$ is an integer of 2 to 10, with 1 mol of a diisocyanate at a temperature of 100 to 200° C. in the melt or in the presence of an inert organic solvent, and a process for preparing them.

Another object of the present invention is the use of said compounds as surfactants in the field of emulsification of organic liquids, which are immiscible with water, and of breaking emulsions. A further object is a concentrate of biocidic thiophosphoric acid esters containing 70 to 90% of the biocide and 30 to 10% of an emulsifier, which essentially consists of a surface-active diurethane of the type as described above.

It is known that oxalkylated higher alcohols and alkylphenols are excellent surface-active substances and are used in many fields of application, among others as detergents, emulsifying and wetting agents.

The block polymers of ethylene-oxide to hydrophobic polyalkylene-glycols, for instance polypropylene-glycol, the so-called Pluronics®, likewise show certain surface-active properties, although the latter are less distinctly perceptible.

In addition to these two classes of compounds many other surface-active substances exist, such as, for instance, the various soapy compounds. In this respect the calcium salts of anion-active acids in particular may be mentioned, such as dodecylbenzenesulfonic acid and tetrapropylbenzenesulfonic acid.

According to Belgian Pat. 698,120 mixtures of said calcium salts with the above-mentioned block polymers prove to be good emulsifying agents for liquid concentrates of water-insoluble biocides. With the aid of said emulsifier combinations stable emulsions of the active substances of thiophosphoric acid esters which are known particularly as being difficult to emulsify, for instance the well known insecticides Malathion® (O,O-dimethyl-S-(1,2-dicarbethoxy-ethyl)-dithiophosphate), Parathion (4-nitrophenyl-diethyl-thiophosphate) and Methylparathion (4-nitro-phenyl-dimethyl-thiophosphate) containing more than 50% of active substance can be prepared. For many purposes it is, however, more favorable to use stable emulsions of a still higher concentration. (®=registered trademark.)

Now we have found that excellent surface-active substances showing an increased emulsifying action on water-insoluble biocides in comparison with the known products, can be obtained by reacting 1 mol each of the above-mentioned oxalkylated fatty alcohols and/or phenols on the one hand and the bulk polymers on the other hand, together with 1 mol of a diisocyanate, whereby diurethanes are formed.

As oxalkylated alcohols and/or alkylphenols there are suitable, above all, compounds that can be obtained by addition of about 2 to 10 mols of ethylene-oxide to 1 mol of an aliphatic alcohol with about 8 to 18 carbon atoms and/or of a mono-, di- or trialkylated phenol or naphthol. The alkyl residues of the alkylphenols and alkylnaphthols which may be used for the manufacture of these products may contain, in total, about 4 to 22 carbon atoms. There are particularly suitable, for example, the reaction products of alcohols containing 16 to 18 carbon atoms with 6 to 10 mols of ethylene-oxide, preferably 8 mols of ethylene-oxide, of tributylphenol with 3–5 mols, preferably 4 mols of ethylene-oxide and of nonylphenol with 4–6 mols, preferably 5 mols of ethylene-oxide.

As regards the above-mentioned bulk polymers, those types are used that are formed by addition of 35 to 100 percent by weight of ethylene-oxide to water-insoluble polyalkylene-glycols on the basis of propylene-oxide, butylene-oxide or epichlorohydrin having a molecular weight of 500 to 3000, and that show molecular weights of from 1000 to 6000, preferably of from 2000 to 4000.

A characteristic of the two above-mentioned classes of compounds is their content of free hydroxy groups, the oxalkylated alcohols or alkylphenols only containing one, the bulk polymers always containing two hydroxy groups in the molecule. With these free hydroxy groups there easily and quantitatively react in known manner aliphatic and/or aromatic diisocyanates such as hexamethylenediisocyanate, the mixtures of 2,4- and 2,6-toluylene-diisocyanate, naphthylene-1,5-diisocyanate as well as products that are formed in the course of their partial reaction with compounds containing bifunctional low-molecular active hydrogen atoms, for instance, glycols, in a ratio of 2 mols of diisocyanate to 1 mol of diol. Compounds are likewise suitable that under the given conditions set free isocyanate groups, for instance, the polyadducts of isocyanates and phenol.

The novel surface-active compounds of oxalkylated higher alcohols and/or alkylphenols, the above-mentioned bulk polymers and diisocyanates can be prepared by heating a mixture of the starting components in the presence of catalysts, such as, for instance, tertiary amines or organometallic compounds, for instance dibutyltin-dilaurate. The reaction can be performed in the fused mass of the components or by heating a solution or dispersion of the components in an inert organic solvent. In general, the reaction is performed at temperatures above 100° C. to about 200° C., preferably at 150–170° C. It is of advantage to stir the mixture of the reaction components vigorously during the reaction, in order to complete and to promote the reaction. All starting materials and the solvents have to be freed from water to a high extent, before adding the diisocyanates in order to avoid decomposition of the latter with formation of carbon-dioxide. Other impurities, particularly alkalies, may be removed. The reaction may be performed discontinuously or continuously.

The products obtained according to the process of the invention show excellent surface-active properties. They can be used with special advantage as emulsifying agents, preferably for the emulsification of water-insoluble biocide concentrates. The products of the invention may be used per se or in admixture with other surface-active substances. In combination with the calcium salts of anionactive acids and alkylarylpolyglycol ethers stable emulsions of biocides having a content of active substance of up to 85% may be produced. In addition to pesticides also other substances such as, for example, castor oil, coconut fatty amine may be rendered distributable in water. When used in a correspondingly low dose—200 to 2 p.p.m.—it is possible with the aid of the new substances to break crude oil-water-emulsions very quickly and, above all, at room temperature, a strong decrease of viscosity being simultaneously observed as regards the crude oil.

The following examples illustrate the invention.

EXAMPLE 1

(a) 6 Parts of a bulk polymer consisting of 50% each of ethylene-oxide and propylene-oxide and 0.88 part of an adduct of tributylphenol and 5 mols of ethylene-oxide are freed to a large extent from water by heating them to 170° C. in a current of nitrogen. After cooling to 120–140° C., a solution of 0.34 part of a mixture of toluylene-2,4- and -2,6-diisocyanate in 0.6 part of dry benzene is slowly introduced while thoroughly stirring. When this supply is terminated the whole is heated again for half an hour. 7.37 Parts of a brown sirup are obtained which is easily soluble in water, methanol, xylene and various other solvents.

(b) To 70 parts of this product there are added 17 parts of a solution of the calcium salt of tetrapropylbenzenesulfonic acid of about 70% strength in isobutanol and 13 parts of the reaction product of tributylphenol with 20 mols of ethylene-oxide. An emulsifier mixture is obtained of which 10 to 15 parts are sufficient in order to convert 85 parts of Ethylparathion (O,O-diethyl-O-(4-nitrophenyl)-monothiophosphate) in applied concentrations of 0.1 to 5% into very finely disperse emulsions, in which case also especially hard waters may be used.

(c) 2 Parts of the product mentioned in sub (a) are dissolved in 8 parts of castor oil and converted into a stock emulsion of 50% strength by stirring in 10 parts of water. This emulsion is subsequently diluted to the desired final concentration by adding further amounts of water, for instance 80 parts. A stable oil-in-water emulsion is obtained.

EXAMPLE 2

(a) 3.6 Parts of a bulk polymer of about 85 parts of propylene-oxide and 44 parts of ethylene-oxide with a molecular weight of about 3000 together with 0.57 part of a reaction product of nonylphenol with 8 mols of ethylene-oxide are dissolved in 3.5 parts of xylene and heated to the boil. An azeotropic mixture of water and xylene distils off. At the boiling temperature there is subsequently added within 1 hour a solution of 0.17 part of hexamethylene-diisocyanate in double the volume of dry xylene. The reaction is terminated after stirring for a further half an hour. The product is obtained in the form of a solution of about 50% strength.

(b) 140 Parts of this solution are mixed with 15 parts of a solution of the calcium salt of tetrapropylenebenzene-sulfonic acid of about 70% strength in isobutanol. To this mixture 15 parts of a reaction product of nonylphenol with 17 mols of ethylene-oxide are then added.

(c) If 85 parts of Malathion are mixed with 16 to 24 parts of batch (b) a concentrate is obtained which may be distributed in highly disperse form in quantities of 0.5 to 5% in tap water.

(d) If 40 to 10 p.p.m. of solution (a) are continuously added to a Bavarian crude oil, the substance nearly quantitatively separates after a short time into petroleum and salt water; the pressure in the tube simultaneously considerably decreases.

(e) 0.5 Part of the product prepared in the quantitative proportions according to (a) but under the reaction conditions of example 1, i.e. without the use of solvents, is mixed in the heat with 9.5 parts of coconut fatty amine and stirred with 10 parts of tap water at room temperature. A pasty preparation of the water-in-oil emulsion type is obtained.

EXAMPLE 3

3 Parts of a bulk polymer according to example 1 are heated for 1 hour under reduced pressure to 120 to 130° C. together with 0.43 part of a reaction product of $C_{16}$–$C_{18}$-fat alcohol with 4 mols of ethylene-oxide. 0.17 Part of toluylenediisocyanate is then slowly introduced while very thoroughly stirring. After a further heating for 30 minutes to 120 to 140° C. the reaction is terminated and the reaction mixture is diluted with half the amount by weight of the batch with n-butanol or isobutanol. To 105 parts of this solution of about 66% strength there are added 10.5 parts of the calcium salt of dodecylbenzenesulfonic acid dissolved in 21 parts of isobutanol and 15 parts of the reaction product of nonylphenol with 18 mols of ethylene-oxide. An emulsifier is obtained of which 10 to 15% are sufficient to render the above-mentioned biocides on phosphoric acid ester base stably convertible into an emulsion.

We claim:

1. An insecticidal composition consisting of 70 to 90% of O,O-dimethyl-S-(1,2-dicarbethoxy-ethyl)-dithiophosphate, 4-nitrophenyl-diethyl-thiophosphate, or 4-nitrophenyl-dimethyl-thiophosphate and 30 to 10% of an emulsifier consisting of (a) 65 to 75% of a diurethane,
(b) 20 to 15% of a solution of 70% strength of calcium dodecyl benzene sulfonate or tetrapropylene benzene sulfonate in isobutanol and
(c) 15 to 10% of a reaction product of tributyl phenol with 20 mols of ethylene oxide or a reaction product of nonylphenol with 17 or 18 mols of ethylene oxide said diurethane being obtained by reacting 1 mol of a bulk polymer of a molecular weight of 1,000 to 6,000 consisting of a water-insoluble polyether of a molecular weight of 500 to 3,000 on the basis of propylene oxide, butylene oxide or epichlorohydrine, to which 35 to 100%, referred to the weight of the polyether, of ethylene oxide was added, and 1 mol of a polyether alcohol of the formula $$R—(C_2H_4O)_nH$$

in which R is alkyl of 8 to 18 carbon atoms, mono-, bis- or tris-alkyl benzene or mono-, bis- or tris-alkyl naphthalene, each alkyl containing 4 to 22 carbon atoms, and $n$ is an integer of 2 to 10, with 1 mol of a diisocyanate at a temperature of 100 to 200° C. in the melt or in the presence of an inert organic solvent, said diisocyanate being selected from the group consisting of:

(a) hexamethylenediisocyanate
(b) mixtures of 2,4- and 2,6-toluylene-diisocyanate, and
(c) naphthylene-1,5-diisocyanate.

References Cited

UNITED STATES PATENTS

| | | | |
|---|---|---|---|
| 2,946,767 | 7/1960 | Gassmann et al. | 260—47 |
| 3,027,399 | 3/1962 | Merten | 260—471 |

ALBERT T. MEYERS, Primary Examiner

A. J. ROBINSON, Assistant Examiner

U.S. Cl. X.R.

424—78, 218